US010781334B2

(12) United States Patent
Avramidis

(10) Patent No.: US 10,781,334 B2
(45) Date of Patent: Sep. 22, 2020

(54) COMPOSITIONS COMPRISING A COPOLYMER OF A SOLID GRADE OLIGOMER AND A HYDROPHOBIC MONOMER AND/OR A GAS-PHASE MONOMER AND METHODS OF MAKING THE SAME

(71) Applicant: BASF SE, Ludwigshafen (DE)

(72) Inventor: Kostas S. Avramidis, Charlotte, NC (US)

(73) Assignee: BASF SE (DE)

( * ) Notice: Subject to any disclaimer, the term of this patent is extended or adjusted under 35 U.S.C. 154(b) by 0 days.

(21) Appl. No.: 14/776,778

(22) PCT Filed: Mar. 11, 2014

(86) PCT No.: PCT/EP2014/054708
§ 371 (c)(1),
(2) Date: Sep. 15, 2015

(87) PCT Pub. No.: WO2014/140016
PCT Pub. Date: Sep. 18, 2014

(65) Prior Publication Data
US 2016/0032138 A1 Feb. 4, 2016

Related U.S. Application Data

(60) Provisional application No. 61/790,608, filed on Mar. 15, 2013.

(51) Int. Cl.
C09D 147/00 (2006.01)
C09D 125/00 (2006.01)
C08F 257/00 (2006.01)
C08F 265/02 (2006.01)
C09D 125/10 (2006.01)

(52) U.S. Cl.
CPC .......... C09D 147/00 (2013.01); C08F 257/00 (2013.01); C08F 265/02 (2013.01); C09D 125/10 (2013.01); Y02A 30/333 (2018.01)

(58) Field of Classification Search
CPC ... C09D 147/00; C09D 125/00; C08F 257/00; C08F 265/02
USPC ................................. 524/836, 819
See application file for complete search history.

(56) References Cited

U.S. PATENT DOCUMENTS

| 3,352,808 | A | * | 11/1967 | Grosser ............... C08F 271/02 524/127 |
| 4,414,370 | A | | 11/1983 | Hamielec et al. |
| 4,529,787 | A | | 7/1985 | Schmidt et al. |
| 4,530,956 | A | * | 7/1985 | Ugelstad ............... C08F 2/22 524/458 |
| 4,546,160 | A | | 10/1985 | Brand et al. |
| 4,806,207 | A | | 2/1989 | Monzon et al. |
| 5,770,648 | A | * | 6/1998 | Antonelli ............. C08F 257/02 524/522 |
| 5,804,632 | A | * | 9/1998 | Haddleton ........... C08F 265/02 524/458 |
| 5,981,011 | A | | 11/1999 | Overcash et al. |
| 7,105,587 | B2 | | 9/2006 | Tagge et al. |
| 8,895,658 | B2 | | 11/2014 | Dandreaux et al. |
| 8,940,847 | B2 | | 1/2015 | Cavallin |
| 9,365,731 | B2 | | 6/2016 | Jhaveri et al. |
| 2004/0044136 | A1 | | 3/2004 | Jin |
| 2005/0027071 | A1 | | 2/2005 | Deeter |
| 2006/0063871 | A1 | | 3/2006 | Taylor |
| 2006/0135709 | A1 | | 6/2006 | Hasegawa et al. |
| 2009/0326189 | A1 | | 12/2009 | Tazzia |
| 2012/0152459 | A1 | | 6/2012 | Avramidis |

FOREIGN PATENT DOCUMENTS

| CN | 1989162 | | 6/2007 |
| EP | 0393871 | A1 | 3/1990 |
| FR | 2139136 | A1 | 1/1973 |
| FR | 2359880 | A1 | 2/1978 |
| GB | 1382490 | A | 2/1975 |
| GB | 1529274 | A | 10/1978 |
| JP | S5840349 | A | 3/1983 |
| JP | 2006052365 | | 2/2006 |
| JP | 2006152484 | | 6/2006 |
| SU | 220497 | A1 | 11/1967 |
| WO | 1983001453 | A1 | 4/1983 |

(Continued)

OTHER PUBLICATIONS

Toagosei Annual Report, "Creating Business, Value and Profit" 1999, 38 pages.
Technical Data Sheet for Joncryl® 504, 2010, 3 pages.
Technical Data Sheet for Joncryl® 678, 2010, 3 pages.
News Release from Toagosei, Jun. 1998 available at www.toagosei.co.jp/english/news/press/backnumber/n980617.html, pulled Nov. 16, 2017, 2 pages.
Create your Coatings Brochure, commercial SGOs shown as available from BASF Corporation under the trademark Joncryl®, 2011, 40 pages.
Yuan et al., Journal of Applied Polymer Science, 2003, 1988-1999.
Yuan et al., Macromolecules 2002, 35, 8346-8355.

Primary Examiner — Kelechi C Egwim
(74) Attorney, Agent, or Firm — Faegre Drinker Biddle & Reath LLP

(57) ABSTRACT

The present disclosure relates to compositions comprising a copolymer derived from polymerizing a hydrophobic monomer and/or a gas-phase monomer in the presence of a solid grade oligomer. In some embodiments, the hydrophobic monomer includes styrene and butadiene. In some embodiments, the copolymer is derived from polymerizing a gas-phase monomer. The present disclosure also relates to methods of making the disclosed compositions. The compositions disclosed herein can be used in a variety of applications including, but not limited to, asphalt compositions, paints, coatings, paper binding and coating compositions, foams, or adhesives.

14 Claims, 11 Drawing Sheets

(56) References Cited

FOREIGN PATENT DOCUMENTS

| WO | 1995004767 A1 | 2/1995 |
| WO | 9804767 | 2/1998 |
| WO | 98/18839 A1 | 5/1998 |
| WO | 2005090413 A1 | 9/2005 |
| WO | 2005123796 A1 | 12/2005 |
| WO | 2013113934 | 8/2013 |
| WO | 2014139999 A1 | 9/2014 |

\* cited by examiner

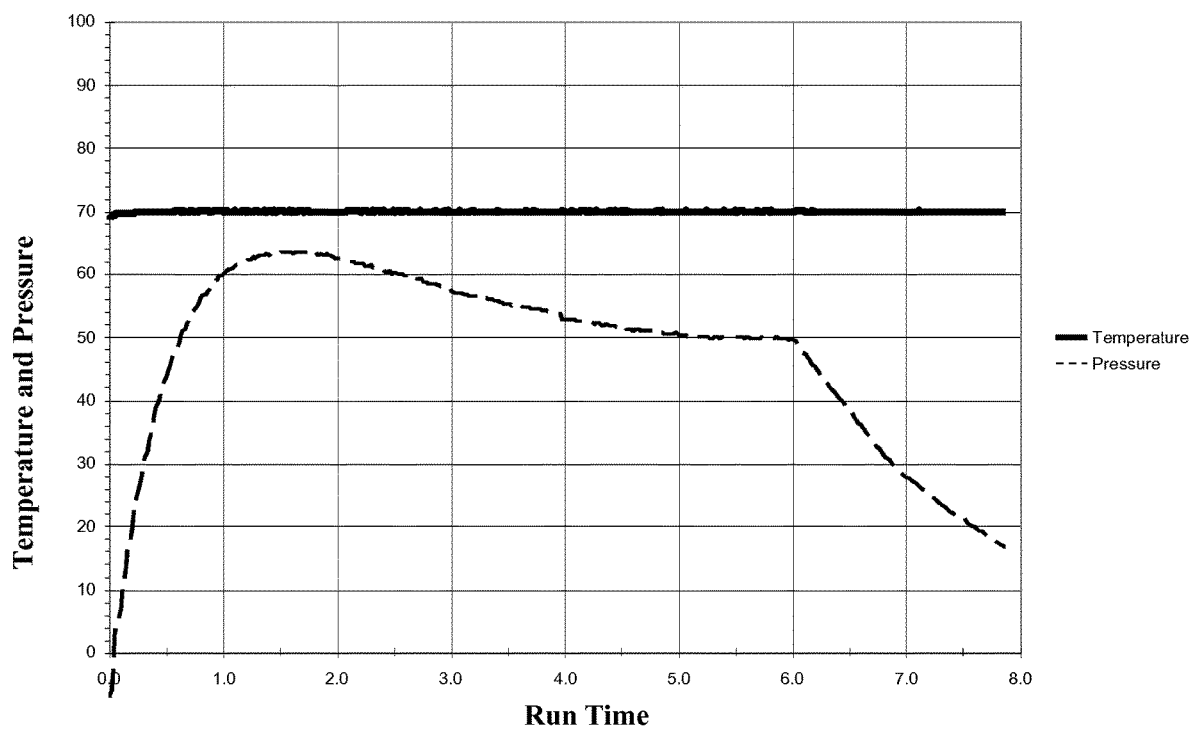
Figure 1. Temperature (°C) and pressure (psi) over run time (hours) for the polymerization of a copolymer comprising 50 parts by weight styrene and 50 parts by weight butadiene (and no solid grade oligomer).

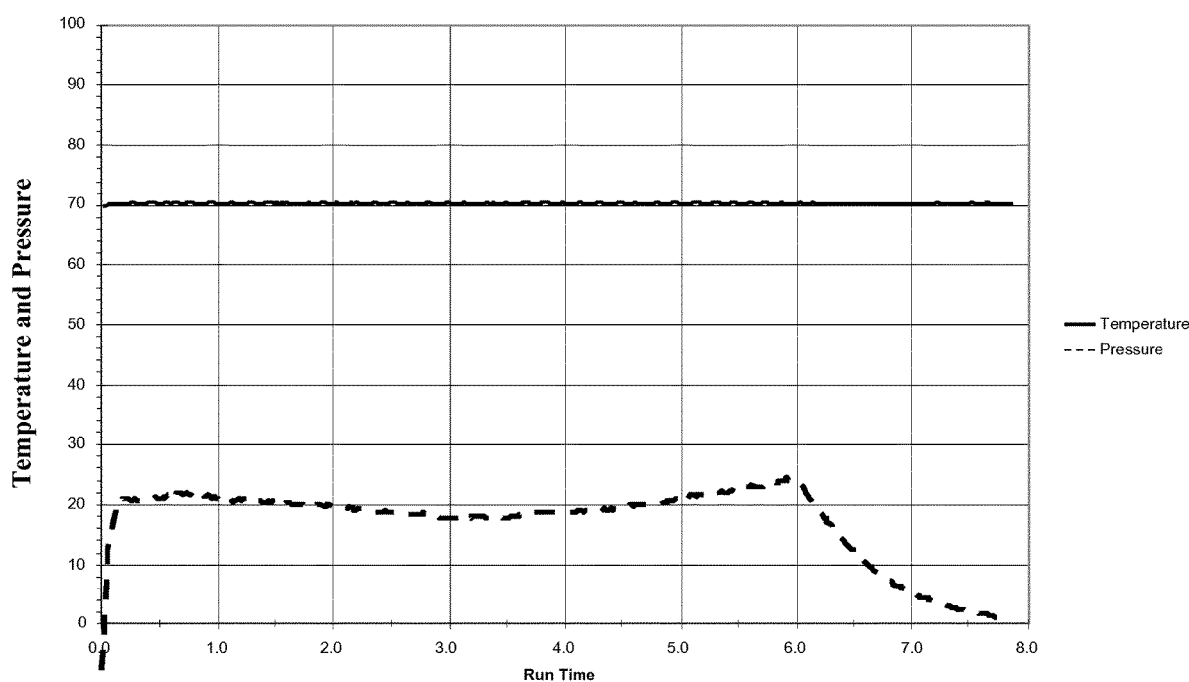
Figure 2. Temperature (°C) and pressure (psi) over run time (hours) for the polymerization of a copolymer comprising 50 parts by weight styrene, 50 parts by weight butadiene, and 20 parts by weight solid grade oligomer (SGO).

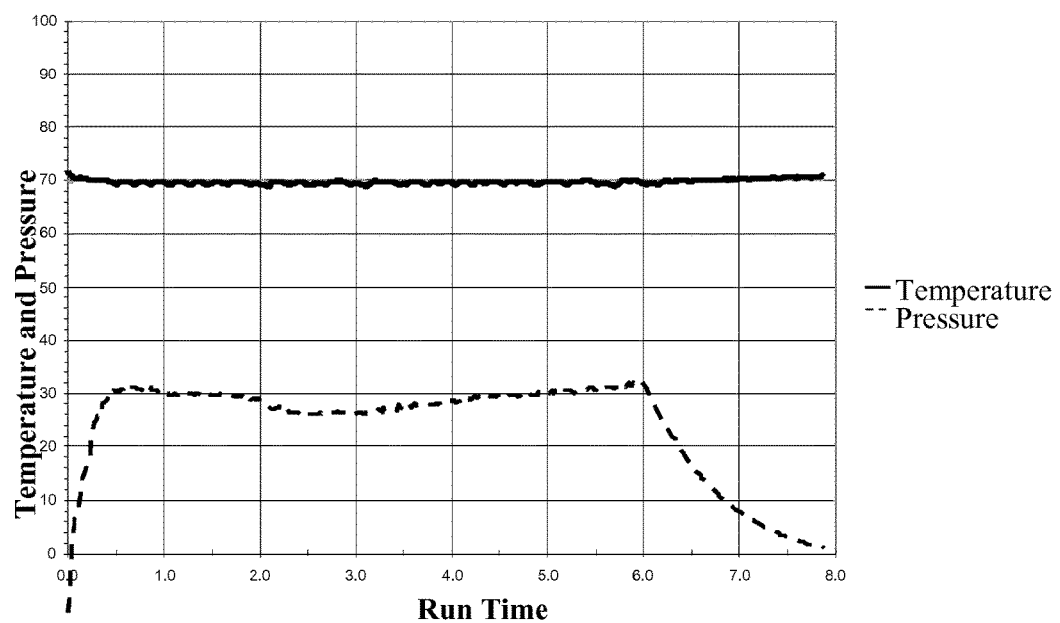
Figure 3. Temperature (°C) and pressure (psi) over run time (hours) for the polymerization of a copolymer comprising 40 parts by weight styrene, 60 parts by weight butadiene, and 20 parts by weight solid grade oligomer (SGO).

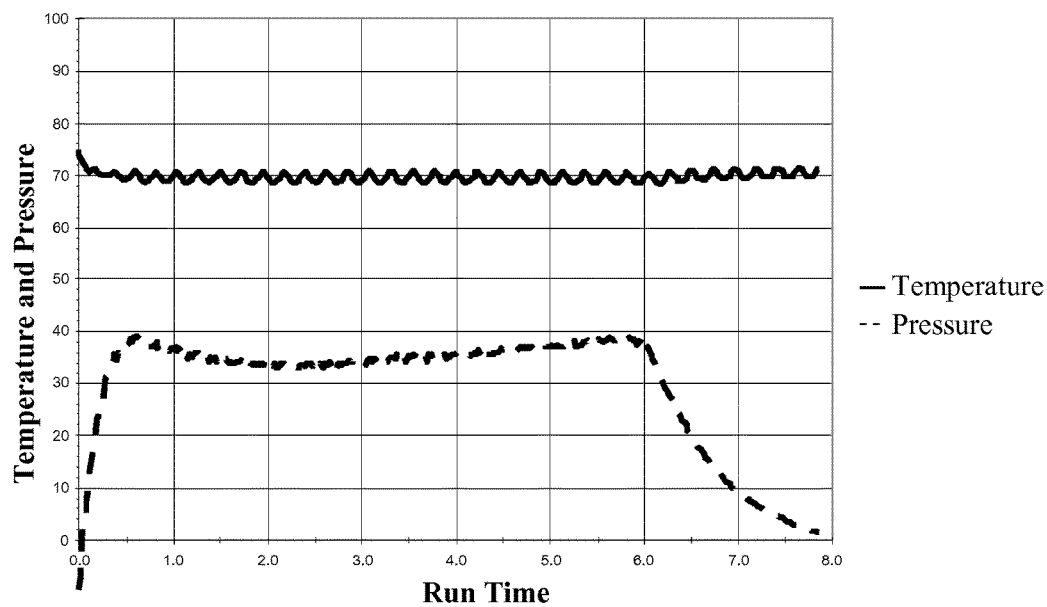
Figure 4. Temperature (°C) and pressure (psi) over run time (hours) for the polymerization of a copolymer comprising 30 parts by weight styrene, 70 parts by weight butadiene, and 20 parts by weight solid grade oligomer (SGO).

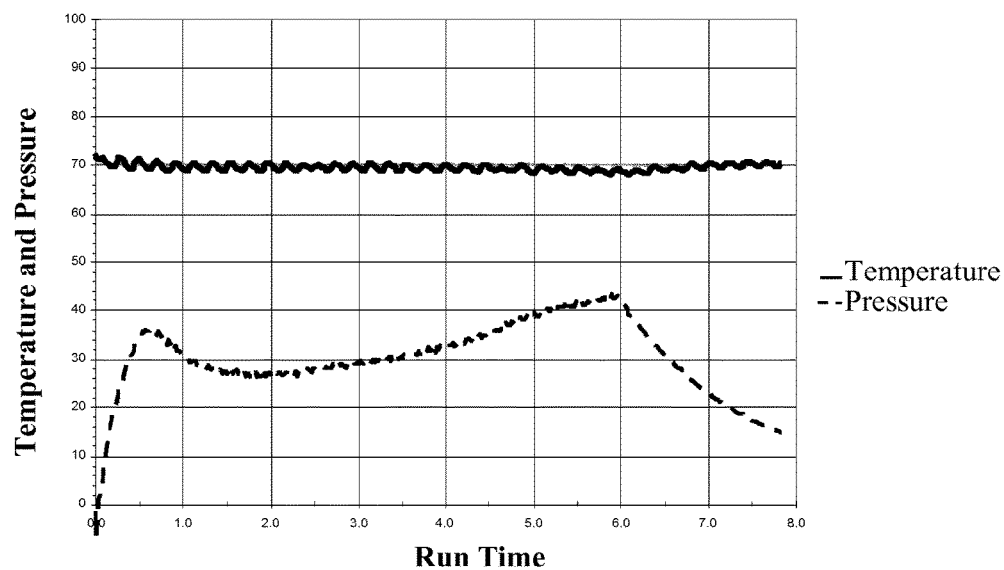
Figure 5. Temperature (°C) and pressure (psi) over run time (hours) for the polymerization of a copolymer comprising 50 parts by weight styrene, 50 parts by weight butadiene, and 20 parts by weight of an alternate solid grade oligomer (SGO).

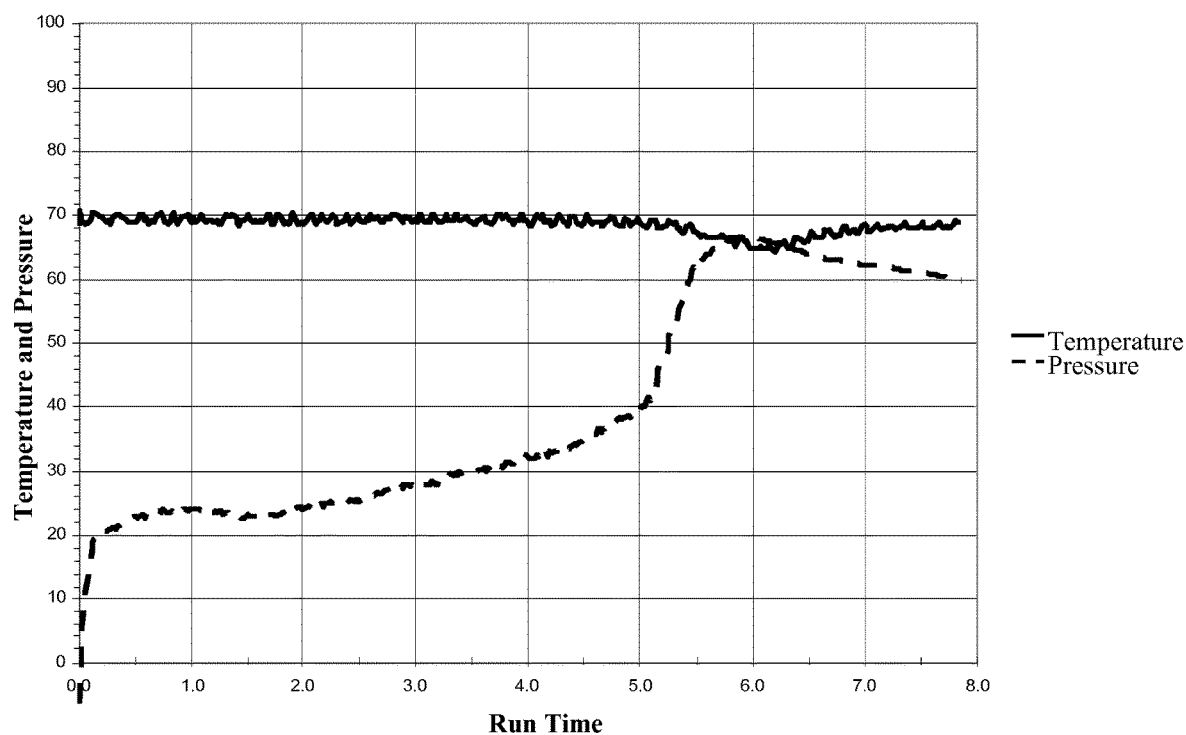
Figure 6. Temperature (°C) and pressure (psi) over run time (hours) for the polymerization of a copolymer comprising 50 parts by weight styrene, 50 parts by weight butadiene, and 20 parts by weight of an alternate solid grade oligomer (SGO).

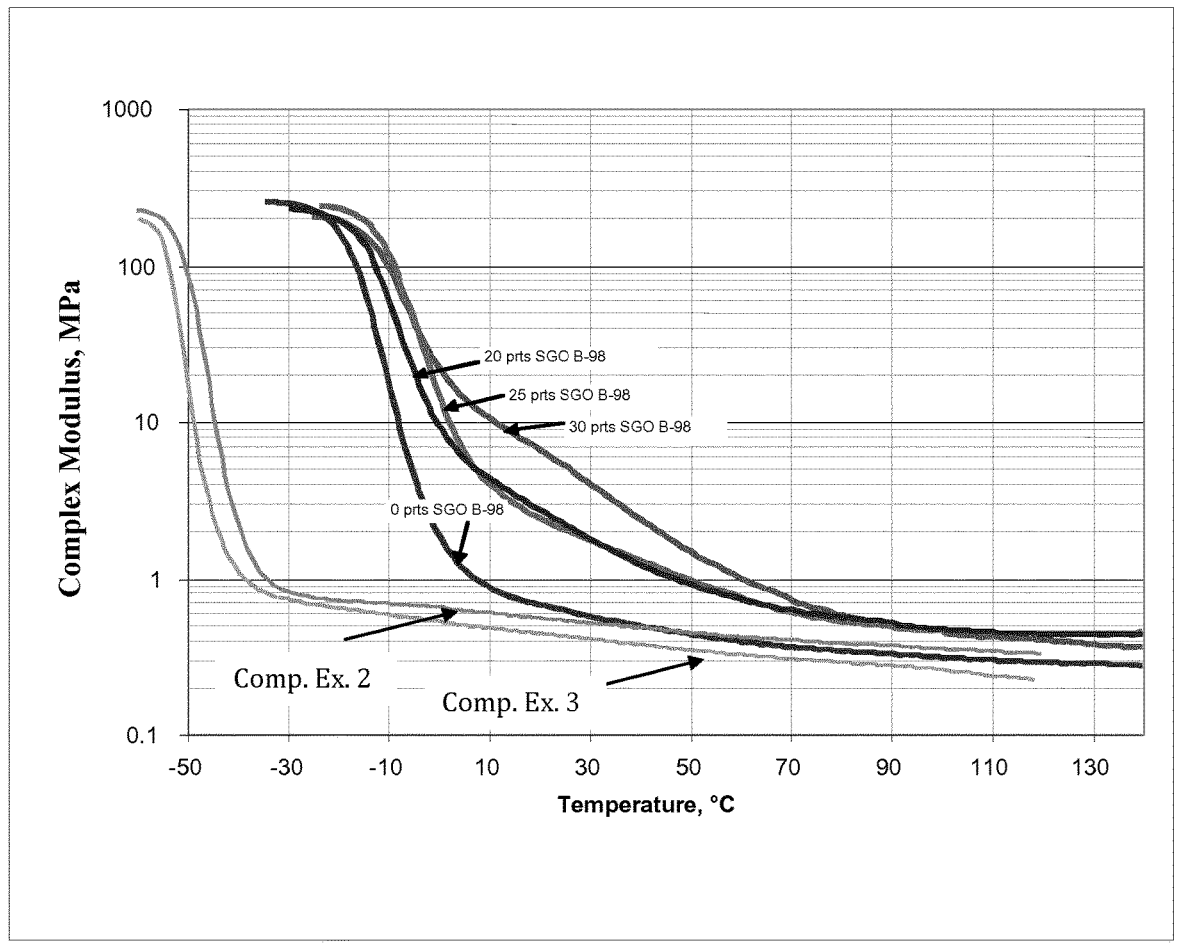
Figure 7. A comparison of temperature (°C) to complex modulus (MPa) for copolymers comprising 50 parts by weight styrene, 50 parts by weight butadiene, and various amounts of solid grade oligomer (SGO).

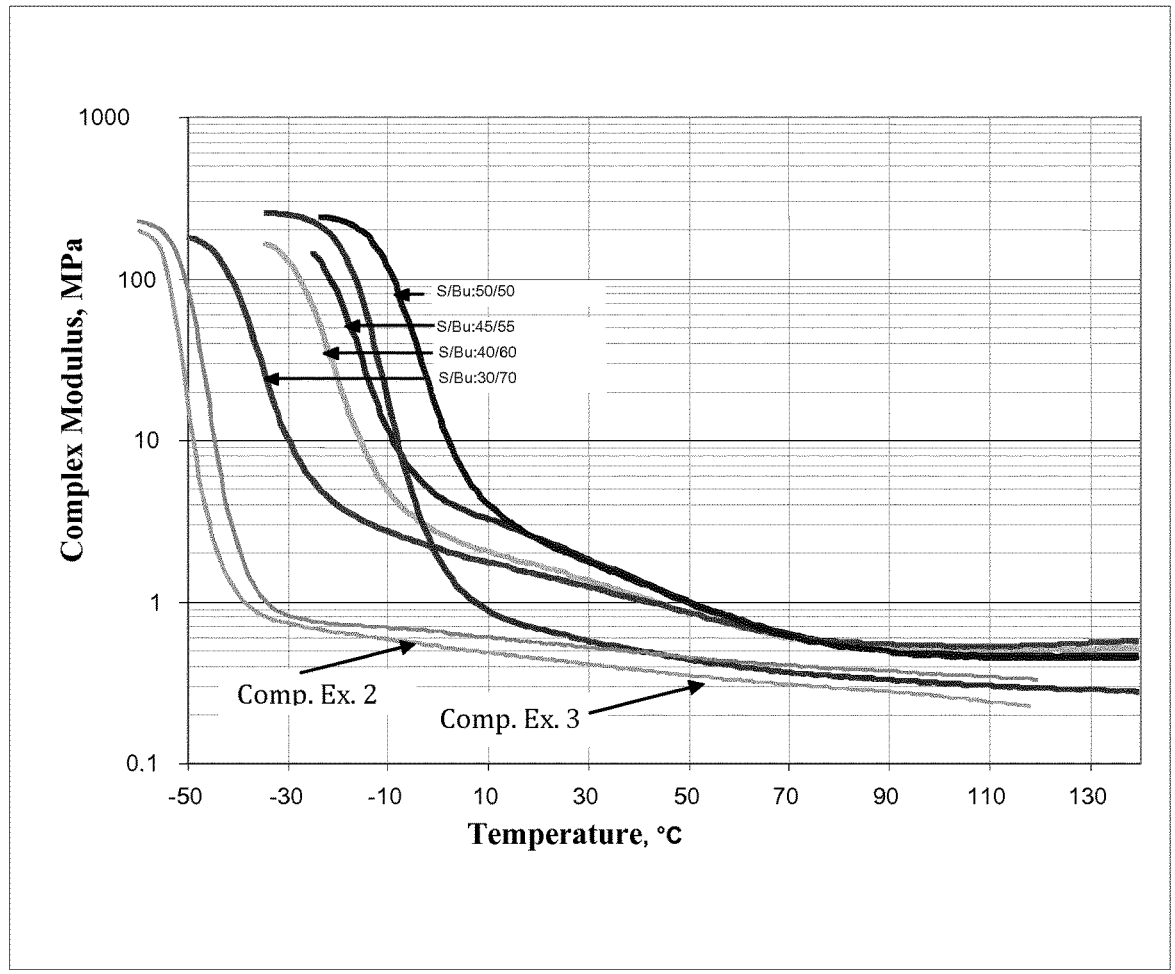
Figure 8. A comparison of temperature (°C) to complex modulus (MPa) for copolymers comprising 20 parts of solid grade oligomer (SGO) and various amounts of styrene and butadiene.

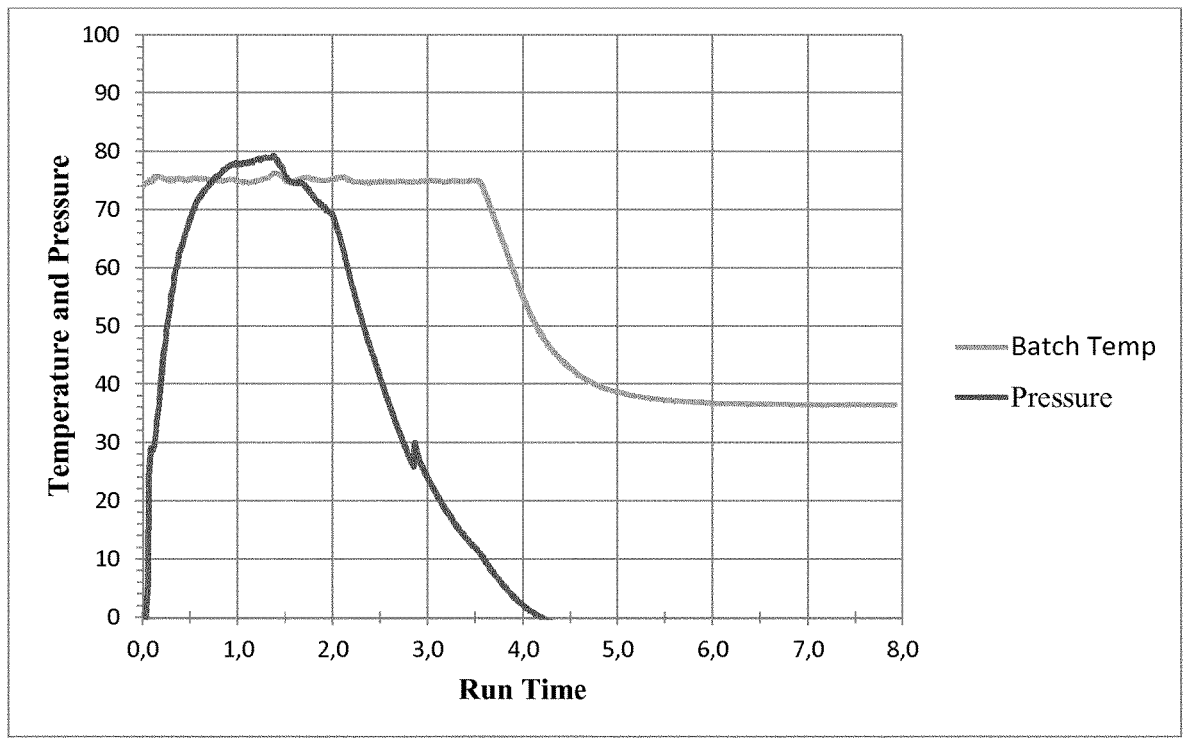
Figure 9. Temperature (°C) and pressure (psi) over run time (hours) for the polymerization of a copolymer comprising 50 parts by weight styrene, 50 parts by weight butadiene, and 20 parts by weight solid grade oligomer (SGO).

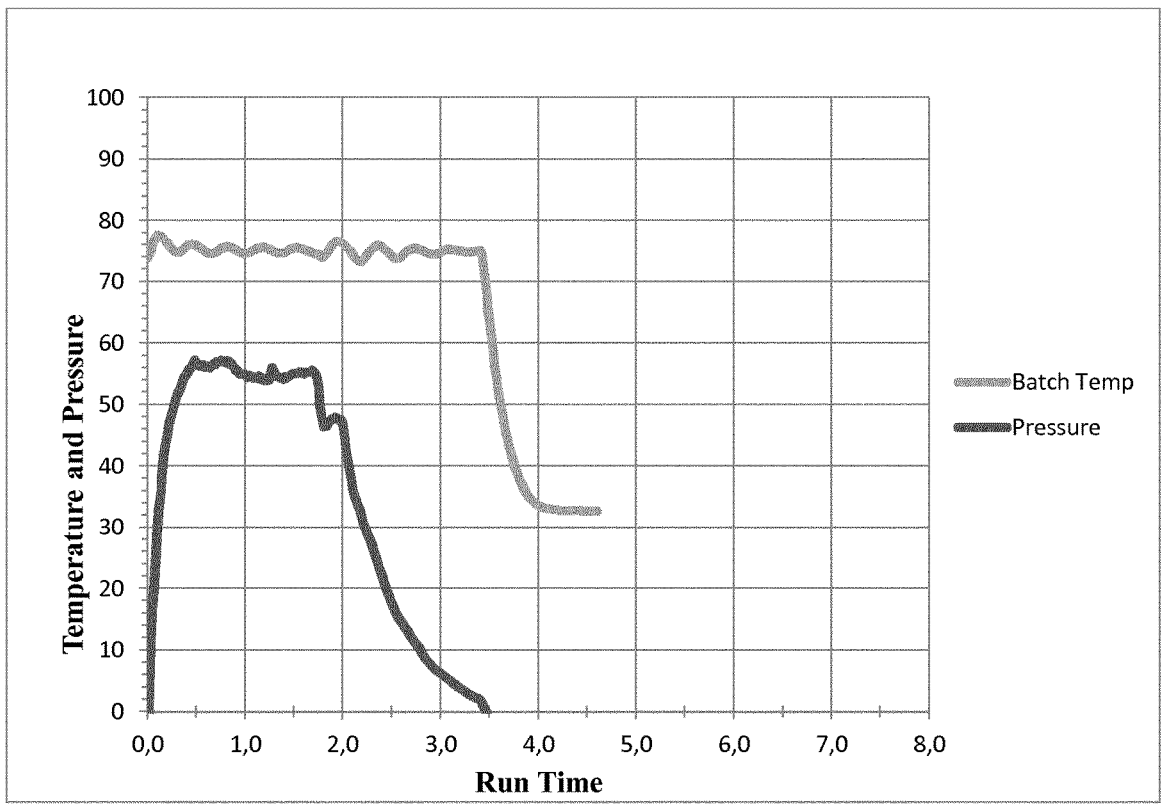
Figure 10. Temperature (°C) and pressure (psi) over run time (hours) for the polymerization of a copolymer comprising 50 parts by weight styrene, 50 parts by weight butadiene, and 20 parts by weight solid grade oligomer (SGO).

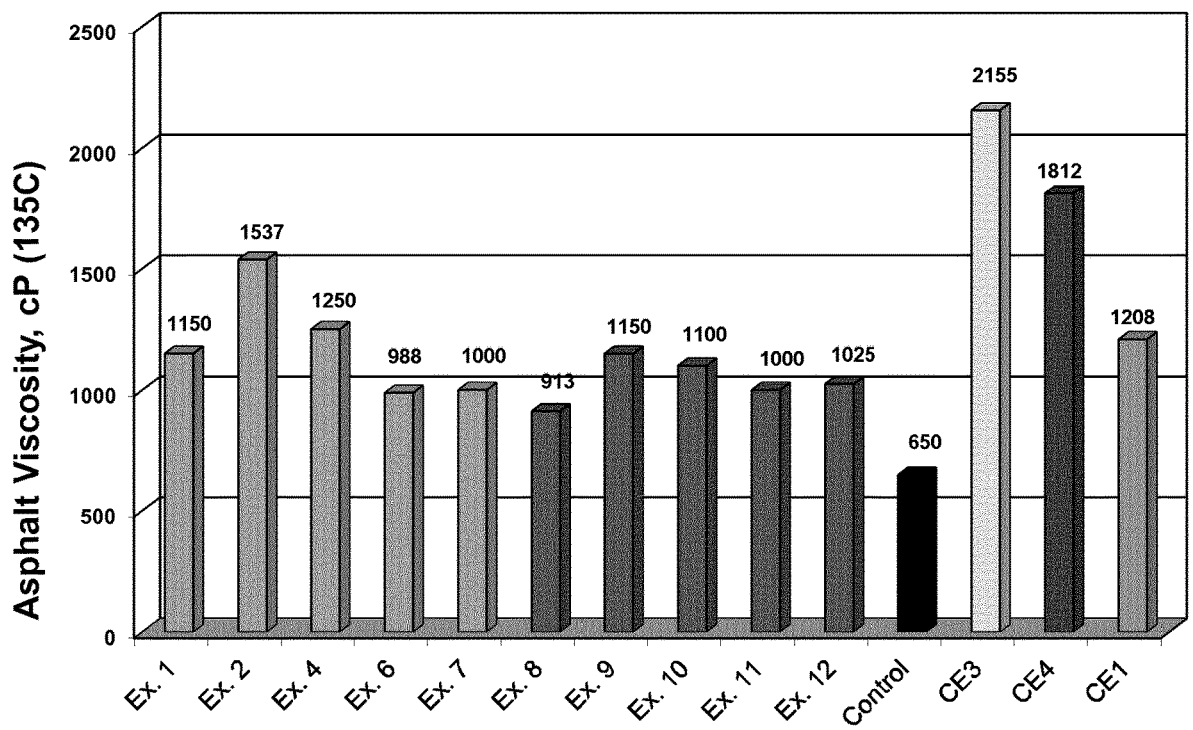
Figure 11. The impact of certain styrene butadiene copolymers, including copolymers as described in this disclosure, on asphalt viscosity (cP, measured at 135°C).

COMPOSITIONS COMPRISING A COPOLYMER OF A SOLID GRADE OLIGOMER AND A HYDROPHOBIC MONOMER AND/OR A GAS-PHASE MONOMER AND METHODS OF MAKING THE SAME

CROSS-REFERENCE TO RELATED APPLICATIONS

This application claims the benefit of U.S. Provisional Application No. 61/790,608 filed Mar. 15, 2013, the disclosure of which is hereby incorporated by reference in its entirety.

FIELD OF THE DISCLOSURE

The present disclosure relates to compositions comprising a copolymer derived from polymerizing a hydrophobic monomer and/or a gas-phase monomer in the presence of a solid grade oligomer. The present disclosure also relates to methods of making the disclosed compositions.

BACKGROUND

Certain polymerization processes using hydrophobic monomers and/or gas-phase monomers occur at high polymerization pressures that require special equipment to withstand the high pressures. For instance, conventional styrene-butadiene polymerizations are conducted using high polymerization pressures, particularly when higher amounts of butadiene monomer are used. In addition, the polymerization of gas-phase monomers such as ethylene often requires high polymerization pressures. As an alternative to higher polymerization pressures, long polymerization reaction times are used resulting in less throughput and lower levels of production. The polymerization temperature can be increased to reduce the pressure or reaction time for polymerization, but adjustments to temperature are limited. Therefore, finding a way to conduct polymerization processes such as styrene-butadiene and ethylene polymerization processes at lower pressure without increasing reaction time or temperature is desirable.

SUMMARY OF THE DISCLOSURE

Disclosed herein are compositions comprising a copolymer derived from polymerizing a hydrophobic and/or a gas-phase monomer in the presence of a solid grade oligomer. In some embodiments, the copolymer is further derived from a hydrophilic monomer (e.g., a carboxylic acid monomer). In some embodiments, the hydrophobic monomer includes styrene, butadiene, a carboxylic acid-based hydrophobic monomer, or a mixture thereof. In some embodiments, the copolymer is derived from a hydrophobic monomer. The hydrophobic monomer can include styrene and a (meth)acrylic acid-based monomer (e.g., a (meth)acrylic acid-based hydrophobic monomer). The hydrophobic monomer can consist of butadiene. The hydrophobic monomer can include styrene and butadiene. In some embodiments, the copolymer is derived from 4%-80% by weight styrene, 4%-80% by weight butadiene, and 8%-25% by weight solid grade oligomer. In some embodiments, the copolymer is derived from 25%-59% by weight styrene, 25%-59% by weight butadiene, and 8%-25% by weight solid grade oligomer. In some embodiments, the copolymer is derived from a gas-phase monomer. Exemplary gas-phase monomers include, but are not limited to, ethylene, propylene, isobutylene, vinyl chloride, vinylidene chloride, or mixtures thereof. In some embodiments, the copolymer is further derived from vinyl acetate. For instance, the copolymer can be derived from greater than 0% ethylene and 81% or less vinyl acetate. In some embodiments, the copolymer is derived from 16%-41% by weight ethylene, 41%-67% by weight vinyl acetate, and 8%-25% by weight solid grade oligomer.

In some embodiments, the solid grade oligomer is derived from a vinyl aromatic monomer (e.g., styrene, α-methyl styrene, or a combination thereof). The solid grade oligomer can be further derived from a carboxylic acid monomer (e.g., acrylic acid), or a salt or ester thereof. In some embodiments, the solid grade oligomer is an amine salt of a modified acrylic copolymer, an ammonium salt of a modified acrylic copolymer, or a combination thereof. In some embodiments, the copolymer is crosslinked (e.g., via ionic crosslinking). The compositions disclosed herein can be used, for instance, in an asphalt composition, a paint, a coating, a paper coating or binding composition, a carpet composition, an adhesive, or a foam.

The compositions disclosed herein can be aqueous dispersions comprising the copolymers disclosed herein. In some embodiments, the aqueous dispersions have a solids content of at least 50% and a viscosity of from 40 cP to 5,000 cP at 20° C. In some embodiments, the copolymer is provided as a powder.

Also disclosed herein are methods of preparing a copolymer, comprising polymerizing a hydrophobic monomer and a solid grade oligomer and/or a gas-phase monomer in an aqueous medium. The polymerizing step can be an emulsion polymerization step. Also disclosed herein are methods of reducing the reaction time in producing a copolymer, comprising polymerizing a hydrophobic monomer and/or a gas-phase monomer and a solid grade oligomer using emulsion polymerization, wherein the reaction time is reduced without increasing the temperature or pressure of the polymerization step compared to the same polymerization step without the solid grade oligomer. Also disclosed herein are methods of reducing the reaction pressure in producing a copolymer, comprising polymerizing a hydrophobic monomer and/or a gas-phase monomer and a solid grade oligomer using emulsion polymerization, wherein the reaction pressure is reduced without increasing the temperature or reaction time of the polymerization step compared to the same polymerization step without the solid grade oligomer. Also disclosed herein are methods of reducing the reaction temperature in producing a copolymer, comprising polymerizing a hydrophobic monomer and/or a gas-phase monomer and a solid grade oligomer using emulsion polymerization, wherein the reaction temperature is reduced without increasing the pressure or reaction time of the polymerization step compared to the same polymerization step without the solid grade oligomer.

The details of one or more embodiments are set forth in the description below. Other features, objects, and advantages will be apparent from the description and from the claims.

BRIEF DESCRIPTION OF THE FIGURES

FIG. 1 illustrates the temperature and pressure over run time for the polymerization of a copolymer comprising 50 parts by weight styrene and 50 parts by weight butadiene.

FIG. 2 illustrates the temperature and pressure over run time for the polymerization of a copolymer comprising 50 parts by weight styrene, 50 parts by weight butadiene, and 20 parts by weight solid grade oligomer (SGO).

FIG. 3 illustrates the temperature and pressure over run time for the polymerization of a copolymer comprising 40 parts by weight styrene, 60 parts by weight butadiene, and 20 parts by weight solid grade oligomer (SGO).

FIG. 4 illustrates the temperature and pressure over run time for the polymerization of a copolymer comprising 30 parts by weight styrene, 70 parts by weight butadiene, and 20 parts by weight solid grade oligomer (SGO).

FIG. 5 illustrates the temperature and pressure over run time for the polymerization of a copolymer comprising 50 parts by weight styrene, 50 parts by weight butadiene, and 20 parts by weight of an alternate solid grade oligomer (SGO).

FIG. 6 illustrates the temperature and pressure over run time for the polymerization of a copolymer comprising 50 parts by weight styrene, 50 parts by weight butadiene, and 20 parts by weight of an alternate solid grade oligomer (SGO).

FIG. 7 illustrates a comparison of temperature to complex modulus for copolymers comprising 50 parts by weight styrene, 50 parts by weight butadiene, and various amounts of solid grade oligomer (SGO).

FIG. 8 illustrates a comparison of temperature to complex modulus for copolymers comprising 20 parts of solid grade oligomer (SGO) and various amounts of styrene and butadiene.

FIG. 9 illustrates the temperature and pressure over run time for the polymerization of a copolymer comprising 50 parts by weight styrene, 50 parts by weight butadiene, and 20 parts by weight solid grade oligomer (SGO) and depicting a decrease in polymerization time.

FIG. 10 illustrates the temperature and pressure over run time for the polymerization of a copolymer comprising 50 parts by weight styrene, 50 parts by weight butadiene, and 20 parts by weight solid grade oligomer (SGO) and depicting a decrease in polymerization time.

FIG. 11 depicts the impact of certain styrene butadiene copolymers, including copolymers as described in this disclosure, on asphalt viscosity.

DETAILED DESCRIPTION

Disclosed herein are compositions comprising a copolymer derived from polymerizing a hydrophobic monomer and/or gas-phase monomer in the presence of a solid grade oligomer, and methods of making and using the same. As used herein, a "hydrophobic monomer" comprises a monomer having a water solubility of less than 1 g/100 g water at 20° C. As used herein, a "gas-phase monomer" is a monomer that is a gas at 20° C. and atmospheric pressure.

The compositions disclosed herein comprise a copolymer derived from a hydrophobic monomer and/or gas-phase monomer (i.e., a hydrophobic monomer, a gas-phase monomer, or a mixture thereof). In some embodiments, the copolymer is derived from a hydrophobic monomer. The hydrophobic monomer can include any hydrophobic monomer known in the art. In some embodiments, the hydrophobic monomer includes styrene, butadiene, a carboxylic acid-based hydrophobic monomer, or a mixture thereof.

Exemplary carboxylic acid-based hydrophobic monomers include, but are not limited to, hydrophobic esters of $\alpha,\beta$-monoethylenically unsaturated mono- and dicarboxylic acids having 3 to 6 carbon atoms with alkanols having 1 to 12 carbon atoms (e.g., esters of acrylic acid, methacrylic acid, maleic acid, fumaric acid, or itaconic acid, with alkanols such as n-butyl, isobutyl and 2-ethylhexyl acrylates and methacrylates, and n-butyl maleate). In some embodiments, the carboxylic acid-based hydrophobic monomer is a (meth)acrylic acid-based hydrophobic monomer. As used herein, the term "(meth)acryl . . . " refers to "acryl . . . " and "methacryl . . . ." In some embodiments, the (meth)acrylic acid-based hydrophobic monomer includes butyl acrylate, 2-ethylhexyl acrylate, or mixtures thereof.

In some embodiments, the copolymer is derived from a gas-phase monomer. Exemplary gas-phase monomers include, but are not limited to, ethylene, vinyl chloride, vinylidene chloride, propylene, isobutylene, or a mixture thereof.

The solubility of the hydrophobic monomers in water, measured at 20° C., can be 1 g/100 g water or less, 0.6 g/100 g water or less, 0.2 g/100 g water or less, 0.1 g/100 g water or less, 0.05 g/100 g water or less, 0.03 g/100 g water or less, or 0.01 g/100 g water or less. Suitable hydrophobic monomers include as noted herein butyl acrylate (0.16 g/100 g water); butadiene (0.08 g/100 g water); styrene (0.03 g/100 g water); 2-ethylhexyl acrylate (0.01 g/100 g water); vinyl neo-pentanoate (0.08 g/100 g water); vinyl 2-ethylhexanoate (less than 0.01 g/100 g water); vinyl neo-nonanoate (less than 0.001 g/100 g water); vinyl neo-decanoate (less than 0.001 g/100 g water); vinyl neo-undecanoate (less than 0.001 g/100 g water); and vinyl neo-dodecanoate (less than 0.001 g/100 g water). Solubilities can be provided, e.g., from D. R. Bassett, "Hydrophobic Coatings for Emulsion Polymers," Journal of Coatings Technology, January 2001, or High Polymers Vol. IX: Emulsion Polymerization, F. A. Bovey, I. M. Kolthoff, A. I. Medalia and E. J. Meehan, p. 156, 1954.

In some embodiments, the copolymer is derived from 1% or greater, 3% or greater, 5% or greater, 7.5% or greater, 10% or greater, 15% or greater, 20% or greater, 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, or 90% or greater by weight of the hydrophobic monomer and/or gas phase monomer. In some embodiments, the copolymer is derived from 92% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, 7.5% or less, 5% or less, or 3% or less by weight of the hydrophobic monomer and/or gas phase monomer.

The copolymers disclosed herein can be further derived from a hydrophilic monomer. The hydrophilic monomer can include a carboxylic acid monomer, for instance. Exemplary hydrophilic monomers include, but are not limited to, $\alpha,\beta$-monoethylenically unsaturated mono- and dicarboxylic acids, citraconic acid, styrene carboxylic acid, (meth)acrylic acid, itaconic acid, fumaric acid, crotonic acid, dimethacrylic acid, ethylacrylic acid, allylacetic acid, vinylacetic acid, maleic acid, mesaconic acid, methylenemalonic acid, and citraconic acid. Exemplary hydrophilic monomers include carboxylic acid-based monomers such as hydrophilic esters of $\alpha,\beta$-monoethylenically unsaturated mono- and dicarboxylic acids having 3 to 6 carbon atoms with alkanols having 1 to 12 carbon atoms (e.g., esters of acrylic acid, methacrylic acid, maleic acid, fumaric acid, or itaconic acid, with alkanols such as n-ethyl acrylate, methyl acrylate, methyl methacrylate, and dimethyl maleate). Exemplary hydrophilic monomers can also include vinyl acetate, (meth)acrylonitrile, or (meth)acrylamide.

In some embodiments, the copolymer is derived from 1% or greater, 2% or greater, 3% or greater, 4% or greater, 5% or greater, 7.5% or greater, 10% or greater, 15% or greater, 20% or greater, 25% or greater, 30% or greater, 35% or greater, 40% or greater, 45% or greater, 50% or greater, 55% or greater, 60% or greater, 65% or greater, 70% or greater, 75% or greater, 80% or greater, or 85% or greater by weight of the hydrophilic monomer. In some embodiments, the copolymer is derived from 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, 7.5% or less, 5% or less, 4% or less, 3% or less, 2% or less, or 1% or less by weight of the hydrophilic monomer.

The copolymers disclosed herein can be derived from additional hydrophobic or hydrophilic monomers, and particularly in small amounts (e.g., 10% by weight or less, 7.5% by weight or less, 5% by weight or less, 4% by weight or less, 3% by weight or less, 2% by weight or less, 1.5% by weight or less, 1% by weight or less, or 0.5% by weight or less). Exemplary additional monomers include other vinylaromatic compounds (e.g., α-methylstyrene, o-chlorostyrene, and vinyltoluenes); isoprene; anhydrides of α,β-monoethylenically unsaturated monocarboxylic and dicarboxylic acids (e.g., maleic anhydride, itaconic anhydride, and methylmalonic anhydride); other alkyl-substituted acrylamides (e.g., N-tert-butylacrylamide and N-methyl(meth)acrylamide); vinyl and vinylidene halides (e.g., vinyl chloride and vinylidene chloride); vinyl esters of C1-C18 monocarboxylic or dicarboxylic acids (e.g., vinyl acetate, vinyl propionate, vinyl n-butyrate, vinyl laurate and vinyl stearate); C1-C4 hydroxyalkyl esters of C3-C6 monocarboxylic or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with C1-C18 alcohols alkoxylated with from 2 to 50 mol of ethylene oxide, propylene oxide, butylene oxide or mixtures thereof (e.g., hydroxyethyl(meth)acrylate, hydroxypropyl(meth)acrylate, and methylpolyglycol acrylate); and monomers containing glycidyl groups (e.g., glycidyl methacrylate), linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate and sulfopropyl methacrylate); vinylphosphonic acid, dimethyl vinylphosphonate, and other phosphorus monomers (e.g., phosphoethyl (meth)acrylate); alkylamino alkyl(meth)acrylates or alkylaminoalkyl(meth)acrylamides or quaternization products thereof (e.g., 2-(N,N-dimethylamino)ethyl(meth)acrylate, 3-(N,N-dimethylamino)propyl(meth)acrylate, 2-(N,N,N-trimethylammonium)ethyl(meth)acrylate chloride, 2-dimethylaminoethyl(meth)acrylamide, 3-dimethylaminopropyl(meth)acrylamide, and 3-trimethylammoniumpropyl(meth)acrylamide chloride); allyl esters of C1-C30 monocarboxylic acids; N-Vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monomers containing 1,3-diketo groups (e.g., acetoacetoxyethyl(meth)acrylate or diacetonacrylamide; monomers containing urea groups (e.g., ureidoethyl(meth)acrylate, acrylamidoglycolic acid, and methacrylamidoglycolate methyl ether); monoalkyl itaconates; monoalkyl maleates; hydrophobic branched ester monomers; monomers containing silyl groups (e.g., trimethoxysilylpropyl methacrylate), vinyl esters of branched mono-carboxylic acids having a total of 8 to 12 carbon atoms in the acid residue moiety and 10 to 14 total carbon atoms such as, vinyl 2-ethylhexanoate, vinyl neo-nonanote, vinyl neo-decanoate, vinyl neo-undecanoate, vinyl neo-dodecanoate and mixtures thereof, and copolymerizable surfactant monomers (e.g., those sold under the trademark ADEKA REASOAP).

The copolymers disclosed herein can also be derived from a crosslinking agent. Exemplary crosslinking agents include, but are not limited to, N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinking agents can include, for instance, diesters of dihydric alcohols with α,β-monoethylenically unsaturated monocarboxylic acids, of which in turn acrylic acid and methacrylic acid can be employed. Examples of such monomers containing two non-conjugated ethylenically unsaturated double bonds can include alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate and methylenebisacrylamide. In some embodiments, the crosslinking agents can include alkylene glycol diacrylates and dimethacrylates, and/or divinylbenzene.

In addition to being derived from a hydrophobic monomer and/or gas-phase monomer, the copolymers disclosed herein are derived from a solid grade oligomer. In other words, the solid grade oligomer reacts during the polymerization and becomes part of the copolymer. In some embodiments, the copolymer is derived from 8%-25% by weight solid grade oligomer (e.g., from 10%-25%, from 13%-24.5%, from 16%-24%, or from 17%-23%). In some embodiments, the solid grade oligomer includes an ammonium salt of a modified acrylic copolymer, an amine salt of a modified acrylic copolymer, or a combination thereof. In some embodiments, the solid grade oligomer is derived from styrene and α-methyl styrene and includes carboxyl groups. In some embodiments, the solid grade oligomer derived from styrene, α-methyl styrene, and a monomer that provides carboxyl groups (e.g., acrylic acid). In some embodiments, the solid grade oligomer comprises about 33% styrene, about 33% α-methyl styrene, and about 33% acrylic acid. Exemplary commercially available solid grade oligomers include, but are not limited to, SGO Resin B-98 (BASF Corp.), SGO Resin E-08 (BASF Corp.), SGO Resin E-26 (BASF Corp.), SGO Resin B-38 (BASF Corp.), SGO Resin B-39 (BASF Corp.), and SGO Resin B-57 (BASF Corp.).

Without wishing to be bound by theory, it is believed that the solid grade oligomer can impact the polymerization of the hydrophobic monomer and/or gas-phase monomer by two mechanisms: (1) by increasing the solubility of the hydrophobic monomer and/or gas-phase monomer, thus facilitating transport of the hydrophobic monomer and/or gas-phase monomer through the aqueous phase to the particles; and (2) by creating new particles (i.e., increasing particle nucleation in excess of what is achieved by micellar nucleation and/or a seed latex). Both of these factors would explain the observed increase in reaction rate of the polymerization process. Accordingly, the solid grade oligomer can be chosen from any solid grade oligomer that increases the solubility of the hydrophobic monomer and/or gas-phase monomer, creates new particles during polymerization, or a combination thereof. The solid grade oligomer can be chosen from any solid grade oligomer that allows for decreased polymerization pressure when polymerizing hydrophobic monomers and/or gas-phase monomers without increasing reaction time or temperature.

In some embodiments, the copolymer is derived from only one hydrophobic monomer and/or gas-phase monomer (i.e., consists of one hydrophobic monomer or consists of one gas-phase monomer). For example, the copolymer can be formed by polymerizing the solid grade oligomer with a hydrophobic monomer and/or gas-phase monomer selected from styrene, butadiene, ethylene, propylene, isobutylene, vinyl chloride, or vinylidene chloride. In some embodiments, the copolymer is derived from two or more hydrophobic monomers, gas-phase monomers, or mixtures thereof. As noted above, the copolymer can optionally also be derived from one or more hydrophilic monomers. The copolymer can be a random, alternating, or block copolymer depending on the SGO, the hydrophobic monomer(s) and/or the gas-phase monomer(s), and optionally the hydrophilic monomer(s) used to produce the copolymer.

In some embodiments, the hydrophobic monomer includes styrene and butadiene. In some embodiments, the copolymer is derived from 4%-80% by weight styrene (e.g., from 10%-70%, from 15%-65%, from 20%-62%, from 25%-59%, from 28%-48%, or from 32%-42%), from 4%-80% by weight butadiene (e.g., from 10%-70%, from 15%-65%, from 25%-62%, from 25%-62%, from 42%-59%, or from 44%-55%), and from 8%-25% by weight solid grade oligomer (e.g., from 12%-25%, from 16%-24%, or from 17%-23%). In some embodiments, the copolymer can be derived from one or more monomers in addition to styrene and butadiene such as (meth)acrylonitrile, (meth)acrylamide and/or a carboxylic acid monomer (e.g., (meth)acrylic acid).

In some embodiments, the hydrophobic monomer includes styrene and a (meth)acrylic acid-based monomer. For example, the (meth)acrylic acid-based monomer can be a (meth)acrylic acid-based hydrophobic monomer such as butyl acrylate or 2-ethylhexyl acrylate. In some embodiments, the (meth)acrylic acid-based monomer can be a (meth)acrylic acid-based hydrophilic monomer such as ethyl acrylate, methyl acrylate, or methyl methacrylate. In some embodiments, the copolymer is derived from 4%-80% by weight styrene (e.g., from 10%-75%, from 15%-70%, from 20%-65%, from 25%-60%, from 30%-55%, from 35%-50%, or from 37%-47%), from 4%-80% by weight (meth)acrylic acid-based hydrophobic monomer (e.g., from 10%-75%, from 15%-70%, from 20%-65%, from 25%-60%, from 30%-55%, from 35%-50%, or from 37%-47%), and from 8%-25% by weight solid grade oligomer (e.g., from 12%-25%, from 16%-24%, or from 17%-23%). In some embodiments, the copolymer can be derived from one or more monomers in addition to styrene and a (meth)acrylic acid-based hydrophobic monomer such as (meth)acrylamide, a carboxylic acid monomer (e.g., (meth)acrylic acid), a phosphate-based monomer (e.g., PEM), an acetoacetoxy monomer (e.g., AAEM), or another functional monomer.

In some embodiments, the copolymer is derived from a gas-phase monomer. Exemplary gas-phase monomers include, but are not limited to, ethylene, vinyl chloride, vinylidene chloride, propylene, isobutylene, or mixtures thereof. In some embodiments, the gas-phase monomer is ethylene and the copolymer is further derived from vinyl acetate. In some embodiments, the copolymer is derived from greater than 0% by weight ethylene (e.g., greater than 5%, greater than 10%, greater than 15%, greater than 20%, greater than 25%, greater than 30%, greater than 35%, greater than 40%). In some embodiments, the copolymer is derived from 16%-41% by weight ethylene (e.g., from 20%-35%, or from 25%-30%). In some embodiments, the copolymer is derived from 81% or less by weight vinyl acetate (e.g., 80% or less, 75% or less, 70% or less, 65% or less, 60% or less, 55% or less, 50% or less, 45% or less, or 40% or less). In some embodiments, the copolymer is derived from 41%-67% by weight vinyl acetate (e.g., from 45%-65%, or from 50%-60%). In some embodiments, the copolymer is derived from 16%-41% by weight ethylene (e.g., from 20%-35%, or from 25%-30%), from 41%-67% by weight vinyl acetate (e.g., from 45%-65%, or from 50%-60%), and from 8%-25% by weight solid grade oligomer (e.g., from 12%-25%, from 16%-24%, or from 17%-23%). In some embodiments, the copolymer is derived from ethylene and one or more of styrene, butadiene, and a carboxylic acid-based hydrophobic monomer.

The glass transition temperature ($T_g$) of the copolymers present in the composition is from −80° C. to 100° C. (e.g., from −70° C. to 90° C., from −60° C. to 80° C., from −50° C. to 70° C., from −40° C. to 60° C., from −30° C. to 50° C., from −20° C. to 40° C., or from −10° C. to 30° C.). The $T_g$ can be measured using differential scanning calorimetry (DSC).

The compositions disclosed herein can be prepared by any polymerization method known in the art. In some embodiments, the compositions disclosed herein are prepared by a dispersion, a mini-emulsion, or an emulsion polymerization. The compositions disclosed herein can be prepared, for instance, by polymerizing the hydrophobic monomer and/or gas-phase monomer in the presence of a solid grade oligomer using free-radical aqueous emulsion polymerization. The emulsion polymerization can be an aqueous emulsion comprising water, a hydrophobic monomer and/or gas-phase monomer, a solid grade oligomer, a cationic emulsifier, an aromatic recycling agent, or combinations thereof. In some embodiments, the polymerization medium is an aqueous medium. Solvents other than water can be used in the emulsion. The emulsion polymerization can be carried out either as a batch, semi-batch, or continuous process. In some embodiments, a portion of the monomers can be heated to the polymerization temperature and partially polymerized, and the remainder of the polymerization batch can be subsequently fed to the polymerization zone continuously, in steps or with superposition of a concentration gradient. The process can use a single reactor or a series of reactors as would be readily understood by those skilled in the art. For example, a review of heterophase polymerization techniques is provided in M. Antonelli and K. Tauer, Macromol. Chem. Phys. 2003, vol. 204, p 207-19.

A copolymer dispersion can be prepared by first charging a reactor with water, a hydrophobic monomer and/or gas-phase monomer, a solid grade oligomer, and optionally at least one nonionic surfactant. A seed latex, though optional, can be included in the reactor to help initiate polymerization and helps produce a polymer having a consistent particle size. Any seed latex appropriate for the specific monomer reaction can be used such as a polystyrene seed. The initial charge can also include a chelating or complexing agent such as ethylenediamine tetraacetic acid (EDTA). Other compounds such as buffers can be added to the reactor to provide the desired pH for the emulsion polymerization reaction. For example, bases or basic salts such as KOH or tetrasodium pyrophosphate can be used to increase the pH whereas acids or acidic salts can be used to decrease the pH. The initial charge can then be heated to a temperature at or near the reaction temperature, for example, to between 50° C. and 100° C. (e.g., between 55° C. and 95° C., between 58° C. and 90° C., between 61° C. and 85° C., between 65° C. and 80° C., or between 68° C. and 75° C.).

After the initial charge, the monomers that are to be used in the polymerization can be continuously fed to the reactor in one or more monomer feed streams. The monomers can be supplied as a pre-emulsion in an aqueous medium, particularly if acrylate monomers are used in the polymerization. An initiator feed stream can be also continuously added to the reactor at the time the monomer feed stream is added although it may also be desirable to include at least a portion of the initiator solution to the reactor before adding a monomer pre-emulsion if one is used in the process. The monomer and initiator feed streams are typically continuously added to the reactor over a predetermined period of time (e.g., 1.5-5 hours) to cause polymerization of the monomers and to thereby produce the polymer dispersion. A nonionic surfactant and any other surfactants can be added at this time as part of either the monomer stream or the initiator feed stream although they can be provided in a separate feed stream. Furthermore, one or more buffers can be included in either the monomer or initiator feed streams or provided in a separate feed stream to modify or maintain the pH of the reactor.

As mentioned above, the monomer feed stream can include one or more monomers (e.g., the hydrophobic monomer and/or the gas-phase monomer) and the solid grade oligomer. The monomers can be fed in one or more feed streams with each stream including one or more of the monomers being used in the polymerization process. For example, styrene and butadiene (when used) can be provided in separate monomer feed streams or can be added as a pre-emulsion. It can also be advantageous to delay the feed of certain monomers to provide certain polymer properties or to provide a layered or multiphase structure (e.g., a core/shell structure).

The molecular weight of the copolymers can be adjusted by adding a small amount of molecular weight regulators, for example, 0.01 to 4% by weight, based on the monomers being polymerized. Particular regulators which can be used include organic thio compounds (e.g., tert-dodecylmercaptan), allyl alcohols and aldehydes.

The initiator feed stream can include at least one initiator or initiator system that is used to cause the polymerization of the monomers in the monomer feed stream. The initiator stream can also include water and other desired components appropriate for the monomer reaction to be initiated. The initiator can be any initiator known in the art for use in emulsion polymerization such as azo initiators; ammonium, potassium or sodium persulfate; or a redox system that typically includes an oxidant and a reducing agent. Commonly used redox initiation systems are described, e.g., by A. S. Sarac in *Progress in Polymer Science* 24, 1149-1204 (1999). Exemplary initiators include azo initiators and aqueous solutions of sodium persulfate. The initiator stream can optionally include one or more buffers or pH regulators.

In addition to the monomers and initiator, an anionic or nonionic surfactant (i.e., emulsifier) such as those described herein can be fed to the reactor. The surfactant can be provided in the initial charge of the reactor, provided in the monomer feed stream, provided in an aqueous feed stream, provided in a pre-emulsion, provided in the initiator stream, or a combination thereof. The surfactant can also be provided as a separate continuous stream to the reactor. The surfactant can be provided in an amount of 1%-5% by weight, based on the total weight of monomer and surfactant. In some embodiments, the surfactant is provided in an amount less than 2% by weight.

Once polymerization is completed, the polymer dispersion can be chemically stripped thereby decreasing its residual monomer content. This stripping process can include a chemical stripping step and/or a physical stripping step. In some embodiments, the polymer dispersion is chemically stripped by continuously adding an oxidant such as a peroxide (e.g., t-butylhydroperoxide) and a reducing agent (e.g., sodium acetone bisulfite), or another redox pair to the reactor at an elevated temperature and for a predetermined period of time (e.g., 0.5 hours). Suitable redox pairs are described by A. S. Sarac in *Progress in Polymer Science* 24, 1149-1204 (1999). An optional defoamer can also be added if needed before or during the stripping step. In a physical stripping step, a water or steam flush can be used to further eliminate the non-polymerized monomers in the dispersion. Once the stripping step is completed, the pH of the polymer dispersion can be adjusted and a biocide or other additives can be added. Cationic, anionic, and/or amphoteric surfactants or polyelectrolytes may optionally be added after the stripping step or at a later time if desired in the end product to provide a cationic or anionic polymer dispersion.

Once the polymerization reaction is complete, and the stripping step is completed, the temperature of the reactor can be reduced.

The methods disclosed herein can also include a crosslinking step. In some embodiments, the crosslinking agent is ionic. In some embodiments, the ionic crosslinking agent has a valency of at least 2, at least 3, or at least 4 (e.g., 2, 3, 4, 5 or 6). In some embodiments, the ionic crosslinking agent includes zirconium. In some embodiments, the ionic crosslinking agent includes ammonium zirconium carbonate. The ionic crosslinking agent can be used in an amount of from 0.01% to 5% by weight, based on the weight of the copolymer. Commercially available crosslinking agents include, but are not limited to, BACOTE-20, PROTEC ZZA, ZINPLEX-15, and SILANE Z-6040.

In some embodiments, the polymer particles of the resultant polymer dispersion have an volume-average particle size from 20 nm to 500 nm (e.g., from 40 nm to 480 nm, from 60 nm to 460 nm, from 80 nm to 440 nm, from 100 nm to 420 nm, from 120 nm to 400 nm, from 140 nm to 380 nm, from 160 nm to 360 nm, from 180 nm to 340 nm, from 200 nm to 320 nm, or from 220 nm to 300 nm, or from 240 nm to 280 nm). In some embodiments, the polymer particles of the resultant polymer dispersion have a number average particle size of 20 nm to 300 nm (e.g., from 30 nm to 290 nm, from 40 nm to 280 nm, from 50 nm to 270 nm, from 60 nm to 260 nm, from 70 nm to 250 nm, from 80 nm to 240 nm, from 90 nm to 230 nm, from 100 nm to 220 nm, from 110 nm to 210 nm, from 120 nm to 200 nm, from 130 nm to 190 nm, or from 140 nm to 180 nm). The particle size measurements are made using dynamic light scattering measurements using the Nicomp Model 380 available from Particle Sizing Systems, Santa Barbara, Calif.

The copolymer can be produced as a dispersion that includes, as a disperse phase, particles of the copolymer dispersed in water. The copolymer dispersion can be prepared with a total solids content of from 20% to 70% by weight (e.g., 25% to 65% by weight, 35% to 60% by weight, or 45% to 55% by weight). In some embodiments, the copolymer dispersion can have a total solids content of 50% or greater by weight. Despite the higher solids content of the aqueous dispersions, the aqueous dispersions disclosed herein can have a viscosity of 40 cP to 5,000 cP (e.g., from 100-4,000 cP, from 200-3,000 cP, from 300-2,000 cP, from 400-1,500 cP, or from 500-1,000 cP) at 20° C. The viscosity can be measured using a viscometer with a #2 spindle at 50 rpm at 20° C.

The composition can include one or more surfactants (emulsifiers) such as nonionic surfactants, anionic surfactants, cationic surfactants, amphoteric surfactants, or a mixture thereof. Suitable nonionic surfactants include, but are not limited to, polyoxyalkylene alkyl ethers and polyoxyalkylene alkylphenyl ethers (e.g., diethylene glycol monoethyl ether, diethylene glycol diethyl ether, polyoxyethylene lauryl ether, polyoxyethylene stearyl ether, and polyoxyethylene nonylphenyl ether); oxyethylene-oxypropylene block copolymers; sorbitan fatty acid esters (e.g., sorbitan monolaurate available as SPAN® 20 from Merck Schuchardt OHG, sorbitan monooleate available as SPAN® 80 from Merck Schuchardt OHG, and sorbitan trioleate available as SPAN® 85 from Merck Schuchardt OHG); polyoxyethylene sorbitan fatty acid esters (e.g., polyoxyethylene sorbitan monolaurate available as TWEEN® 20 and TWEEN® 21 from Uniqema, polyoxyethylene sorbitan monopalmitate available as TWEEN® 40 from Uniqema, polyoxyethylene sorbitan monostearate available as TWEEN® 60, TWEEN® 60K, and TWEEN® 61 from Uniqema, polyoxyethylene sorbitan monooleate available as TWEEN® 80, TWEEN® 80K, and TWEEN® 81 from Uniqema, and polyoxyethylene sorbitan trioleate available as TWEEN® 85 from Uniqema); polyoxyethylene sorbitol fatty acid esters (e.g., tetraoleic acid polyoxyethylene sorbitol); glycerin fatty acid esters (e.g., glycerol monooleate); polyoxyethylene glycerin fatty acid esters (e.g., monostearic acid polyoxyethylene glycerin and monooleic acid polyoxyethylene glycerin); polyoxyethylene fatty acid esters (e.g., polyethylene glycol monolaurate and polyethylene glycol monooleate); polyoxyethylene alkylamine; and acetylene glycols. In some embodiments, the nonionic surfactant can have a HLB (hydrophilic lipophilic balance) at room temperature such that 8<HLB<15. In some embodiments, the HLB is 14 or less. In some embodiments, the nonionic surfactant includes an ethylene oxide $(EO)_m$ and/or propylene oxide $(PO)_n$ adduct of an alkyl, alkylbenzene or dialkylbenzene alcohol wherein (m+n)≤14, (m+n)≤12, or (m+n)≤10 (e.g., 6≤(m+n)≤10), such as those available from BASF under the LUTENSOL™ trademark.

Suitable anionic emulsifiers include fatty acids, alkyl sulfates, alkyl ether sulfates, alkyl benzene sulfonic acid, alkyl phosphoric acid or salts thereof, and sucrose esters. Anionic polyelectrolytes such as tartrates, borates, oxalates and phosphates, can also be used in the composition. Additional suitable anionic surfactants and polyelectrolytes include but are not limited to M28B and other anionic surfactants available from MeadWestvaco under the INDULIN® trademark (such as INDULIN® AMS, INDULIN® SA-L, INDULIN® ISE, INDULIN® 201, INDULIN® 202, and INDULIN® 206); anionic surfactants available from Akzo Nobel under the REDICOTE® trademark (such as REDICOTE® E-15 and REDICOTE® E-62C); and lignosulfonates such as those available under the MARASPERSE™ trademark (such as MARASPERSE™ CBOS-3 and MARASPERSE™ N22). In some embodiments, the emulsifier includes an anionic fatty acid-based emulsifier.

Cationic emulsifiers can be classified as cationic rapid setting (CRS), cationic quick setting (CQS), cationic medium setting (CMS), or cationic slow setting (CSS) emulsifiers and these classifications are known in the art and can be readily measured in an emulsion as set forth in ASTM D977 and D2397. In some embodiments, cationic polyelectrolytes can be provided in the composition. Suitable cationic emulsifiers and polyelectrolytes include alkylamine salts, quaternary ammonium salts, cationic surfactants available from Akzo Nobel under the REDICOTE® trademark (such as REDICOTE® 4819, REDICOTE® E-64R, REDICOTE® E-5, REDICOTE® E-9, REDICOTE® E9A, REDICOTE® E-11, REDICOTE® E-16, REDICOTE® E-44, REDICOTE® E-120, REDICOTE® E-250, REDICOTE® E-2199, REDICOTE® E-4868, REDICOTE® C-346, REDICOTE® C.-404, REDICOTE® C.-450, and REDICOTE® C.-471), cationic surfactants available from MeadWestvaco under the INDULIN® and AROSURF® trademarks (such as INDULIN® 814, INDULIN® AMS, INDULIN® DF-30, INDULIN® DF-40, INDULIN® DF-42, INDULIN® DF-60, INDULIN® DF-80, INDULIN® EX, INDULIN® FRC, INDULIN® MQK, INDULIN® MQK-1M, INDULIN® MQ3, INDULIN® QTS, INDULIN® R-20, INDULIN® SBT, INDULIN® W-1, and INDULIN® W-5), ASFIER® N480 available from Kao Specialties Americas, CYPRO™ 514 available from Cytec Industries, polyethyleneimines such as those available from BASF under the POLYMIN® trademark (such as POLYMIN® SK, POLYMIN® SKA, POLYMIN® 131, POLYMIN® 151, POLYMIN® 8209, POLYMIN® P, and POLYMIN® PL), and polyvinylamines such as those available from BASF under the CATIOFAST® trademark (such as CATIOFAST® CS, CATIOFAST® FP, CATIOFAST® GM, and CATIOFAST® PL). Other suitable cationic polyelectrolytes and surfactants include those listed in U.S. Pat. Nos. 5,096,495, 5,160,453, and 5,443,632. In some embodiments, the cationic emulsifier includes an amine-based emulsifier.

Suitable amphoteric surfactants include, but are not limited to, betaine acetate, amide betaine, sulfobetaine, imidazolium betaine, and amine oxides. An exemplary amphoteric surfactant is REDICOTE® E-7000 surfactant, which is available from Akzo Nobel. Suitable anionic emulsifiers include fatty acids, alkyl sulfates, alkyl ether sulfates, alkyl benzene sulfonic acid, alkyl phosphoric acid or salts thereof, and sucrose esters. Anionic polyelectrolytes such as tartrates, borates, oxalates and phosphates, can also be used in the composition. Additional suitable anionic surfactants and polyelectrolytes include but are not limited to M28B and other anionic surfactants available from MeadWestvaco under the INDULIN® trademark (such as INDULIN® AMS, INDULIN® SA-L, INDULIN® ISE, INDULIN® 201, INDULIN® 202, and INDULIN® 206); anionic surfactants available from Akzo Nobel under the REDICOTE® trademark (such as REDICOTE® E-15 and REDICOTE® E-62C); and lignosulfonates such as those available under the MARASPERSE™ trademark (such as MARASP- ERSE™ CBOS-3 and MARASPERSE™ N22). In some embodiments, the emulsifier includes an anionic fatty acid-based emulsifier.

The compositions disclosed herein can also be used in any application wherein conventional polymers derived from polymerizing a hydrophobic monomer and/or a gas-phase monomer can be used. The compositions disclosed herein can be used in a variety of applications including, but not limited to, asphalt compositions, paints, coatings, paper binding and coating compositions (e.g., paper saturation), foams, carpet compositions, or adhesives. In some embodiments, the copolymer dispersion can be spray dried to produce a powder.

In some embodiments, the copolymer is included in an asphalt composition. The asphalt composition can further include one or more additives. Suitable additives include inorganic salts, thickeners and fillers. Inorganic salts can be added, for example to improve emulsifiability, in an amount of up to 1 part by weight. Suitable inorganic salts include sodium chloride, potassium chloride, calcium chloride, aluminum chloride and mixtures thereof. Thickeners can be added in an amount of up to 0.5 parts by weight and can include associative thickeners, polyurethanes, alkali swellable latex thickeners, cellulose, cellulose derivatives, modified cellulose products, plant and vegetable gums, starches, alkyl amines, polyacrylic resins, carboxyvinyl resins, polyethylene maleic anhydrides, polysaccharides, acrylic copolymers, hydrated lime (such as cationic and/or nonionic lime), or mixtures thereof. Mineral fillers and/or pigments can include calcium carbonate (precipitated or ground), kaolin, clay, talc, diatomaceous earth, mica, barium sulfate, magnesium carbonate, vermiculite, graphite, carbon black, alumina, silicas (fumed or precipitated in powders or dispersions), colloidal silica, silica gel, titanium oxides (e.g., titanium dioxide), aluminum hydroxide, aluminum trihydrate, satine white, and magnesium oxide. Fillers such as mineral fillers and carbon black can be included in an amount of up to 5 parts by weight or up to 2 parts by weight. For example, the filler can be provided in an amount of 0.1 part of greater or 0.5 parts or greater. The carbon black can be used to blacken the composition as is desired, for example, in fog seal applications. The mineral filler can be provided as a fine powder and can be used, for example, to increase the set rate of the asphalt emulsion or to reduce or prevent bleeding of the asphalt. Suitable mineral fillers include hydrated lime, limestone dust, Portland cement, silica, alum, fly ash, and combinations thereof. Mineral filler generally refers to a finely divided mineral product wherein at least 65 percent of which will pass through a No. 200 sieve, and typically has an average size that is less than 0.003 inches.

The composition can also include aggregate. The aggregate can be of varying sizes as would be understood by those of skill in the art. Any aggregate that is traditionally employed in the production of bituminous paving compositions can be used, including dense-graded aggregate, gap-graded aggregate, open-graded aggregate, reclaimed asphalt pavement, and mixtures thereof. Dense-graded aggregate exhibits the greatest mineral surface area (per unit of aggregate). Open-graded aggregate largely consist of a single, large-sized (e.g., around 0.375 inch to 1.0 inch) stone with very low levels (e.g., less than about two percent of the total aggregate) of fines (e.g., material less than 0.25 inch) or filler (e.g., mineral material less than 0.075 mm). Gap graded aggregate fall between dense-graded and open-graded classes. Reclaimed asphalt pavement (RAP) material generally reflects the gradation of the pavement from which the reclaimed material was obtained. If the original pavement was a dense-graded mix, the RAP will also be dense graded, although the filler content is generally observed to be lower than the design limits of the origin aggregate specifications. The aggregate can be applied in an amount of from 100 parts by weight to 2000 parts by weight.

Compositions that include aggregate can also include air voids in some embodiments. The air voids can be present in an amount of from 2% to 30% by volume (e.g., greater than 2% to 10% by volume).

An asphalt composition can be prepared by mixing asphalt, any aromatic recycling agents or non-asphaltic rosin materials, copolymer (for example, in the form of a latex dispersion), emulsifier, acid or base, water and any additives. The particular components can be mixed together by means known in the art. In some embodiments, the copolymer is pre-mixed with an anionic emulsifier or a cationic emulsifier to produce a charged copolymer before mixing the asphalt and the acid or base with the emulsifier and the copolymer. If aggregate is blended into the asphalt composition, it can be added, for example, after the other components are blended. In some embodiments, the asphalt composition is prepared at an elevated temperature, for example, from 160° C. to 200° C. (hot mix asphalt), from 120° C. to 140° C. (warm mix asphalt), or at temperatures below 120° C. (e.g., from 50° C. to 100° C. or from 60° C. to 80° C.). In some embodiments, the asphalt composition can be prepared at ambient temperature.

The asphalt composition can be applied for use in a pavement or paved surface. A pavement surface or a paved surface is a hard surface that can bear pedestrian or vehicular travel can include surfaces such as motorways/roads, parking lots, bridges/overpasses, runways, driveways, vehicular paths, running paths, walkways, and the like. The asphalt composition can be applied directly to an existing paved surface or can be applied to an unpaved surface. In some embodiments, the composition is applied to an existing paved layer as a tie layer, and a new layer comprising asphalt such as a hot mix layer is applied to the tie layer. The asphalt composition can be applied to a surface "cold", i.e., at a temperature below 40° C., or can be applied to at an elevated temperature, for example, from 50° C. to 120° C., from 55° C. to 100° C., or from 60° C. to 80° C.

In some embodiments, aggregate is blended into the asphalt composition before application to a surface. In some embodiments, aggregate is applied to the composition after it is applied to a surface. In some embodiments, sand can be applied to the composition after it is applied to a surface, for example, if the composition is to be used as a tack coat, to reduce the tackiness of the surface. The composition and optionally the aggregate can be compacted after application to the surface as would be understood by those of skill in the art.

In some embodiments, the composition is used as a tack coat or coating. The tack coat is a very light spray application of diluted asphalt emulsion that is used to promote a bond between an existing surface and the new asphalt application. The tack coat acts to provide a degree of adhesion or bonding between asphalt layers, and in some instances, may fuse the layers together. The tack coat also acts to reduce slippage and sliding of the layers relative to other layers in the pavement structure during use or due to wear and weathering of the pavement structure. As described above, the composition can be applied to an existing paved layer (such as a hot mix layer) as a tie layer as a tack coat, and a new layer comprising asphalt such as a hot mix layer can be applied to the tack coat. As would be understood by those skilled in the art, the tack coat typically does not include aggregate, although sand may be applied to the tack coat after application as mentioned above. The composition described herein has unexpectedly been found to be a low-tracking or "trackless" coating such that, after the tack coating is cured, paving vehicles or other traffic may be permitted to pass over the coating such that the vehicle tires or treads stick to the coating a limited amount (low track) or not at all (trackless). The composition described herein has unexpectedly been found to be low-tracking or "trackless," for example, at higher pavement temperatures (50° C.-60° C.) and/or with low or medium pen asphalts having a pen value of greater than 40 dmm. The tack coat is tacky and capable of bonding together layers of a pavement structure at ambient conditions for pavement construction or at elevated temperatures, e.g., up to 140° C. as discussed above. In fact, the tack coat provides a sufficiently flexible asphalt at low temperatures with sufficient bond strength to bond adjacent asphalt layers. The tack coat cures quickly such that the pavement layer may be applied to the coating, hours to days after the emulsion is applied to the substrate. The applied composition can cure in 15 minutes to 45 minutes, and may cure as rapidly as 5 minutes to 15 minutes after the composition is applied to the exposed surface. The cure rate will depend on the application rate, the dilution ratios used, the base course conditions, the weather, and other similar considerations. If the prepared pavement surface or base course contains excess moisture, the curing time of the emulsion may be increased.

In some embodiments, the composition can also be used as a fog seal. A fog seal is a surface treatment that applies a light application of the composition to an existing paved surface such as a parking lot to provide an enriched pavement surface that looks fresh and black. In some embodiments, the fog seal would include a filler such as carbon black to blacken the composition. As would be understood by those skilled in the art, the fog seal might not include aggregate. The fog seal compositions, like the bond coat compositions, have also been shown to be to be low-tracking or "trackless" coatings.

In some embodiments for the tack coat and fog seal, the asphalt can be present in an amount of from 58 to 62 parts by weight, the copolymer can be present in an amount of from 2 to 6 parts by weight, the emulsifier can be present in an amount of from 0.75 to 3 parts by weight, the acid or base can be present in an amount of from 0.75 to 3 parts by weight, any optional additives be provided in an amount of up to 5 parts by weight, and water can be present in an amount of from 30 to 40 parts by weight. In some embodiments, the composition can be further diluted with water. The composition can be applied at a rate of 0.05-0.10 gallons/yd$^2$.

In some embodiments, the composition can be used as a chip seal composition. Chip seals are the most common surface treatment for low-volume roads. The chip seal composition can be applied to a surface followed by the application of aggregate. In some embodiments for the chip seal, the asphalt can be present in an amount of from 64 to 67 parts by weight, the copolymer can be present in an amount of from 1.5 to 3.5 parts by weight, the emulsifier can be present in an amount of from 0.15 to 0.35 parts by weight, the acid or base can be present in an amount of from 0.15 to 0.35 parts by weight, any optional additives be provided in an amount of up to 5 parts by weight, and water can be present in an amount of from 30 to 40 parts by weight. The aggregate can be provided in an amount of from 200 to 1000 parts by weight.

In some embodiments, the composition can be used as a microsurfacing application. Microsurfacing is designed for quick traffic return with the capacity of handling high traffic volume roadways. For the microsurfacing composition, aggregate can be mixed in with the asphalt, copolymer, emulsifier and acid or base before application to a surface. In some embodiments for the microsurfacing, the asphalt can be present in an amount of from 60 to 62 parts by weight, the copolymer can be present in an amount of from 3 to 4.5 parts by weight, the emulsifier can be present in an amount of from 0.5 to 2.5 parts by weight, the acid or base can be present in an amount of from 0.5 to 2.5 parts by weight, any optional additives be provided in an amount of up to 5 parts by weight (e.g., 0.25 to 2 parts by weight of one or more inorganic salts or up to 5 parts by weight of a mineral filler), and water can be present in an amount of from 30 to 40 parts by weight. The aggregate can be provided in an amount of from 500 to 2000 parts by weight.

The resulting paved surface layer using the composition, once dried, includes the components provided in the composition with the exception of water. Thus, the paved surface layer can include asphalt in an amount of from 40 to 70 parts by weight, a copolymer in an amount of from greater than 0 to 10 parts by weight, an emulsifier in an amount of from 0.1 to 4 parts by weight, and an acid or base in an amount of from 0.1 to 4 parts by weight. In the case of a tack coat, the paved surface can include a first layer comprising asphalt; a tie layer provided on the first layer, comprising asphalt in an amount of from 40 to 70 parts by weight, the copolymer in an amount of from greater than 0 to 10 parts by weight, an emulsifier in an amount of from 0.1 to 4 parts by weight, and an acid or base in an amount of from 0.1 to 4 parts by weight; and a second layer comprising asphalt provided on the tie layer.

Although parts by weight are used for the compositions described herein, percentages by weight could be used interchangeability with the parts by weight, for example, where the composition includes the asphalt, the copolymer, the emulsifier, the acid or base, the water, and any additives excluding aggregate. For example, the composition can be described to include (a) asphalt in an amount of from 40 to 70 percent by weight; (b) a copolymer in an amount of from greater than 0 to 10 percent by weight; (c) an emulsifier in an amount of from 0.1 to 4 percent by weight; (d) an acid or a base in an amount of from 0.1 to 4 percent by weight; and (e) water in an amount of from 25 to 60 percent by weight.

In some embodiments, the compositions disclosed herein can be used in paints, coatings, paper coating or binding compositions, carpet compositions (e.g., carpet backing), foams, or adhesives. In some embodiments, one or more thickeners (rheology modifiers) can be added to increase the viscosity of the composition. Suitable thickeners can include, but are not limited to, acrylic copolymer dispersions sold under the STEROCOLL and LATEKOLL trademarks from BASF Corporation, Florham Park, N.J., hydroxyethyl cellulose, guar gum, jaguar, carrageenan, xanthan, acetan, konjac, mannan, xyloglucan, urethanes and mixtures thereof. The thickeners can be added to the composition formulation as an aqueous dispersion or emulsion, or as a solid powder.

The composition described herein can include, for instance, additives such as dispersants, initiators, stabilizers, chain transfer agents, buffering agents, salts, preservatives, fire retardants, wetting agents, protective colloids, biocides, corrosion inhibitors, crosslinking promoters, and lubricants. Exemplary dispersants can include sodium polyacrylates in aqueous solution such as those sold under the DARVAN trademark by R.T. Vanderbilt Co., Norwalk, Conn.

Paint and coating compositions can, for instance, include one or more pigments or dyes. Exemplary composition pigments include titanium dioxide composition pigments, MIRAGLOSS 91 (a kaolin clay composition pigment commercially available from BASF Corporation), LOPAQUE M (a kaolin clay composition pigment commercially available from Thiele Kaolin Company), and HYDROCARB 90 (a calcium carbonate composition pigment commercially available from Omya Paper). In some embodiments, the composition can include one or more dyes or colored pigments. Exemplary dyes can include basic dyes, acid dyes, anionic direct dyes, and cationic direct dyes. Exemplary colored pigments include organic pigments and inorganic pigments in the form of anionic pigment dispersions and cationic pigment dispersions.

The methods disclosed herein can be used for the production of high-butadiene content styrene-butadiene or carboxylated styrene-butadiene latexes at lower polymerization pressures, lower temperatures, lower reaction times, or a combination thereof, compared to the pressures, temperatures, and reaction times of the same polymerization without solid grade oligomer. Lower polymerization pressures or lower temperatures can lead to increased plant safety. Lower reaction times can lead to increased plant efficiency and productivity. Additionally, the methods disclosed herein can lead to cost savings in polymer manufacture including, but not limited to, savings associated reduced energy use and savings associated with a decreased need for specialized equipment (e.g., high pressure reactors). Solid grade oligomer modified polymers, when used to modify, for instance, hot asphalt, can result in lower viscosity and improved performance.

By way of non-limiting illustration, examples of certain embodiments of the present disclosure are given below.

EXAMPLES

In Example 1, a copolymer derived from 50 parts by weight styrene, 50 parts by weight butadiene, and 20 parts by solid grade oligomer (SGO B-98) was produced. A styrene feed, a butadiene feed, an initiator feed comprising an aqueous solution of sodium persulfate initiator (0.6 parts by weight of the total monomers), were added over 6 hours to a pre-heated reactor (70° C.) containing water, the solid grade oligomer, sodium hydroxide (0.14 parts by weight of the total monomers), a polystyrene seed latex (1.66 parts by weight of the total monomers), and TRILON BX (0.03 parts by weight of the total monomers), an ethylenediaminetetraacetic acid commercially available from BASF Corporation (Florham Park, N.J.). The stabilization of the latex particles during polymerization was accomplished by feeding an aqueous solution of potassium oleate surfactant (3.6 parts by weight of the total monomers) over the course of the polymerization. The temperature was maintained at 70° C. throughout the polymerization reaction. Following the polymerization process, the latex dispersion was stripped of the residual monomers to provide an aqueous dispersion with residual styrene levels of less than 400 ppm.

Examples 2-7 and Comparative Example 1 were conducted in the same manner as Example 1 except with the differences shown in Table 1. Table 1 also illustrates the pH, viscosity, volume average particle size, number average particle size, and percent solids (% TS) for these compositions.

TABLE 1

SGO MODIFIED STYRENE-BUTADIENE LATEXES—PHYSICAL PROPERTIES

| Example | SGO Used | SGO LEVEL, pts on total monomer | S | BU | % SGO in the particle | pH | Visc (cPs) #2 @ 50 rpm | Particle Size Volume (nm) avg | Particle Size Number (nm) avg | % TS |
|---|---|---|---|---|---|---|---|---|---|---|
| 1 | B-98 | 20 | 50 | 50 | 16.7 | 8 | 165.0 | 154.7 (55 nm, 148 nm) | 49.7 (48 nm, 145 nm) | 45.60 |
| 2 | B-98 | 25 | 50 | 50 | 20 | 7.8 | 50.0 | 57.1 (wide) | 44.3 (wide) | 45.70 |
| 3 | B-98 | 25 | 50 | 50 | 20 | 7.8 | 73.0 | 54.4 (40 nm, 89 nm) | 37.6 (wide) | 46.30 |
| 4 | B-98 | 30 | 50 | 50 | 23.1 | 8.4 | 45.0 | | | 40.70 |
| 5 | E-26 | 20 | 50 | 50 | 16.7 | 7.8 | 1982.0 | 386 | 96 | 39.70 |
| 6 | B-98 | 20 | 40 | 60 | 16.7 | 8.1 | 56 | 67 | 52 | 42.6 |
| 7 | B-98 | 20 | 30 | 70 | 16.7 | 8.45 | 54 | | | 41.2 |
| Comp. Ex. 1 | None | 0 | 50 | 50 | 0 | 9.4 | 25 | 120 | 100 | 41.32 |

FIGS. 1 and 2 illustrate the reaction temperatures and pressures over run time for the dispersions of Comparative Example 1 and Example 1, respectively, during emulsion polymerization at 70° C. As shown in these figures, the emulsion polymerization process conducted using the solid grade oligomer was conducted at a lower pressure over the same run time while maintaining the same temperature.

FIGS. 3 and 4 illustrate the alternative copolymer compositions of Examples 6 and 7 that include different amounts of styrene and butadiene than provided in Example 1. These figures also illustrate an emulsion polymerization processes conducted at lower pressures.

FIG. 5 illustrates an alternative copolymer composition of Example 5 that includes SGO E-26, a different solid grade oligomer than provided in Example 1. FIG. 5 also illustrates an emulsion polymerization process conducted at lower pressure. FIG. 6 illustrates the alternative copolymer composition of Example 5 that includes SGO E-08, a different solid grade oligomer than provided in Example 1. The resultant latex when using SGO E-08 was of compromised stability and very thick, with a viscosity in excess of 15,000 cp. These figures illustrate that although the emulsion polymerization processes were conducted at lower pressures initially, the polymerization pressure increased in the final stage to a level similar to that of the process that uses no solid grade oligomer (SGO).

FIG. 7 illustrates a comparison of temperature to complex modulus for copolymers comprising 50 parts by weight styrene, 50 parts by weight butadiene, and various amounts of solid grade oligomer (SGO), and for commercial styrene-butadiene latices used in asphalt compositions (Comparative Examples 2 and 3). FIG. 8 illustrates a comparison of temperature to complex modulus for copolymers comprising 20 parts of solid grade oligomer (SGO) and various amounts of styrene and butadiene, and for Comparative Examples 2 and 3. As demonstrated by these figures, the copolymers produced using the SGOs have greater elasticity at high temperatures (i.e., greater than 70° C.), which is desirable in many applications including asphalt applications. In addition, at low and intermediate temperatures, i.e., in the 0-70° C. range, the copolymers described herein can be designed by adjusting the SGO level and/or the styrene/butadiene ratio to produce differentiated complex modulus profiles depending on the desired application.

FIG. 9 illustrates the temperature and pressure over run time for the polymerization of a copolymer comprising 50 parts by weight styrene, 50 parts by weight butadiene, and 20 parts by weight solid grade oligomer (SGO) and depicting a decrease in polymerization time, and resulting in a solids content of 53%. FIG. 10 illustrates a similar sample with a solids content of 50%. FIGS. 9 and 10 represent a 2.25 hr feed time polymerization process compared to 6 hrs for the same polymerization (such as the one conducted for Comparative Example 1) in the absence of the solid grade oligomer (SGO).

Latex Polymer-Modified Asphalt Sample Preparation

Asphalt cement was preheated to 160° C.+/−3° C. for at least two hours and then 650 grams of the heated asphalt cement was poured into a metallic can. The asphalt-containing can was heated to 170° C.+/−3° C. using a heating mantle. A blade was inserted at an angle at approximately 20° in the middle of the can to provide optimum mixing. The latex prepared according to the method described above was added slowly to the hot asphalt with mixing at 300-325 rpm. Unless otherwise specified, the amount of latex polymer solids added to the asphalt was 3 wt % based on the total solids content of the latex polymer and asphalt. After each addition, time was allowed for most of the bubbling to cease and then the mixer speed was increased to approximately 400-700 rpm to blend the resulting mixture. After latex addition, the mixing was continued for two additional hours to achieve an equilibrated asphalt polymer mixture. Samples of the polymer modified asphalts were taken for viscosity measurement or poured into molds for any desired testing.

SHRP Binder Testing of Latex Polymer-Modified Asphalt

The Strategic Highway Research Program (SHRP) evaluation of latex polymer modified asphalts was carried out according to the ASTM D7175 or AASHTO T315 procedure on the original latex polymer modified asphalt, on the latex polymer modified asphalt following Rolling Thin-Film Oven (RTFO) exposure, and also on the RTFO conditioned latex polymer modified asphalt that was conditioned in the Pressure Aging Vessel (PAV). The Dynamic Shear Rheometer (DSR) tests measure the dynamic shear modulus and stiffness of the latex polymer modified asphalt. In addition, Bending Beam Rheometer (BBR) testing was carried out according to ASTM D6678 or AASHTO T313 to measure the low temperature stiffness characteristics of the latex polymer modified asphalt binders. Testing of the original (unaged or fresh) latex polymer modified asphalt and of the latex polymer modified asphalt after RTFO exposure provided the High Temperature in the Performance Grade (PG) scale. Testing of the latex polymer modified asphalt after RTFO and PAV exposure provided the stiffness at intermediate temperatures related to fatigue resistance and BBR testing after RTFO and PAV exposure provided the Low Temperature in the PG scale.

Viscosity of Latex Polymer-Modified Asphalt

The viscosities of the latex polymer modified asphalts prepared according to the methods described above were measured according to ASTM D4402 or AASHTO T316 (American Association of State Highway and Transportation Officials).

FIG. 11 depicts the impact of certain styrene butadiene copolymers, including copolymers as described in this disclosure (Examples 1, 2, 4, 6 and 7), on asphalt viscosity. Examples 8-12 are based on Examples 1, 2, 4, 6 and 7, respectively, and further include 2.1% by weight of a sulfur crosslinking agent, based on the weight of asphalt. In addition to Comparative Examples 1 and 3, a control was provided including NUSTAR 64-22 asphalt as well as a comparative example (Comparative Example 4, a commercial styrene-butadiene latex used in asphalt composition and similar to Comparative Example 3, but with a higher amount of a chain transfer agent). As depicted in this figure, the copolymers including the SGO had improved viscosity over the comparative examples not including a SGO. In addition, although not illustrated, the High SHRP Temperature increased by one Performance Grade (PG) when the copolymers based on the SGO were added at a 3 wt % dry polymer-to-asphalt level to NUSTAR 64-22 asphalt, either alone or in combination with 2.1 wt % of a sulfur-based crosslinking agent, based on the weight of asphalt. The Low SHRP Temperature of the NUSTAR 64-22 asphalt was extended to −28° C. for some of the copolymers based on the SGO at a 3 wt % dry polymer-to-asphalt level.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A composition comprising:
a copolymer derived from polymerizing hydrophobic monomers comprising from 25%-59% by weight styrene and from 25%-59% by weight butadiene in an aqueous medium and in the presence of from 8%-25% by weight of an oligomer, wherein the percents by weight are based on the total monomer weight of the copolymer,
wherein the hydrophobic monomers have a solubility in water as measured at 20° C. of 1 g/100 g water or less,
wherein the oligomer is derived from a vinyl aromatic monomer, and
wherein the copolymer is derived from 65% by weight or greater of the hydrophobic monomers, based on the total monomer weight of the copolymer.

2. The composition according to claim 1, wherein the copolymer is further derived from a hydrophilic monomer, wherein the hydrophilic monomer includes a carboxylic acid monomer.

3. The composition according to claim 1, wherein the hydrophobic monomers further include a carboxylic acid-based hydrophobic monomer.

4. The composition according to claim 3, wherein the hydrophobic monomers include a (meth)acrylic acid-based hydrophobic monomer.

5. The composition according to claim 1, wherein copolymer is derived from polymerizing from 42%-59% by weight butadiene, wherein the percents by weight are based on the total monomer weight of the copolymer.

6. The composition according to claim 1, wherein the vinyl aromatic monomer is selected from styrene, α-methyl styrene, or a combination thereof.

7. The composition according to claim 6, wherein the oligomer is further derived from a carboxylic acid monomer, or a salt or ester thereof.

8. The composition according to claim 7, wherein the carboxylic acid monomer includes acrylic acid.

9. The composition according to claim 1, wherein the oligomer is an amine salt of a modified acrylic copolymer, an ammonium salt of a modified acrylic copolymer, or a combination thereof.

10. The composition according to claim 1, wherein the composition is an aqueous dispersion comprising the copolymer and the aqueous dispersion has a solids content of at least 50% by weight.

11. An asphalt composition comprising the composition according to claim 1.

12. A method of preparing a copolymer according to claim 1, comprising:
polymerizing hydrophobic monomers comprising from 25%-59% by weight styrene and from 25%-59% by weight butadiene in the presence of from 8%-25% by weight of an oligomer in an aqueous medium, wherein the percents by weight are based on the total monomer weight of the copolymer,
wherein the hydrophobic monomers have a solubility in water as measured at 20° C. of 1 g/100 g water or less,
wherein the oligomer is derived from a vinyl aromatic monomer, and
wherein the copolymer is derived from 65% by weight or greater of the hydrophobic monomers, based on the total monomer weight of the copolymer.

13. The method according to claim 12, wherein the polymerizing step is an emulsion polymerization step.

14. The method according to claim 12, further comprising crosslinking the copolymer using ionic crosslinking.

* * * * *